(12) United States Patent
Li et al.

(10) Patent No.: US 8,243,775 B2
(45) Date of Patent: Aug. 14, 2012

(54) ID-CELL INDEX SEARCH ALGORITHM AND CARRIER FREQUENCY OFFSET ESTIMATION

(75) Inventors: Junqiang Li, Sunnyvale, CA (US); Je Woo Kim, Cupertino, CA (US); Jong Hyeon Park, San Jose, CA (US); Matthias Brehler, Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 774 days.

(21) Appl. No.: 12/337,641

(22) Filed: Dec. 18, 2008

(65) Prior Publication Data

US 2010/0158079 A1     Jun. 24, 2010

(51) Int. Cl.
*H04L 1/7083*     (2006.01)
(52) U.S. Cl. ...................................................... 375/142
(58) Field of Classification Search ................. 375/140, 375/142, 145, 150, 365, 367, 368
See application file for complete search history.

(56) References Cited

U.S. PATENT DOCUMENTS

| | | | | |
|---|---|---|---|---|
| 5,867,478 | A | * | 2/1999 | Baum et al. ................... 370/203 |
| 6,563,881 | B1 | * | 5/2003 | Sakoda et al. ................ 375/260 |
| 8,031,784 | B2 | * | 10/2011 | Lee et al. ...................... 375/260 |
| 2005/0163238 | A1 | * | 7/2005 | Fujii ............................. 375/260 |

OTHER PUBLICATIONS

Initial Synchronization for Wibro, Hyoungsoo Lim and Dong Seung Kwon, Electronics and Telecommunications Research Institute (ETR), 161 Gajeong-Dong, Yuseong-Gu Daejeon 305-350, Korea, 2005 Asia-Pacific Conference on Communication, Perth Western Australia, Oct. 3-5, 2005.
International Search Report and Written Opinion—PCT/US2009/067883, International Search Authority—European Patent Office—Mar. 18, 2010.
Eu-Suk Shim, et al., "OFDM Integer Frequency Offset Estimator in Rapidly Time-Varying Channels" Communications, 2006 Asia-Pacific Conference on, IEEE, PI, Aug. 1, 2006, pp. 1-4, XP031024212 ISBN: 978-1-4244-0573-2.

* cited by examiner

*Primary Examiner* — Kevin Kim
(74) *Attorney, Agent, or Firm* — Tyler Overall

(57) ABSTRACT

Techniques for initial wireless network synchronization by a mobile station are provided. For certain embodiments, the techniques may involve a joint search for the cell identification (ID-cell index) and the coarse carrier frequency offset (CFO) estimation. For certain embodiments, the techniques may be based on hard correlation and binary differential despreading that substantially simplifies computational complexity compare to known techniques that independently search for the ID-cell index and perform CFO estimation.

20 Claims, 8 Drawing Sheets

US 8,243,775 B2

ID-CELL INDEX SEARCH ALGORITHM AND CARRIER FREQUENCY OFFSET ESTIMATION

TECHNICAL FIELD

The present disclosure generally relates to wireless communication systems and more specifically to a method for detection of cell identification (ID-cell index) and coarse carrier frequency offset (CFO) estimation during a primary synchronization between mobile station and base station.

SUMMARY

Certain embodiments provide a method for detecting a cell identification (ID-cell) index and a coarse carrier frequency offset (CFO) estimation. The method generally includes performing a hard differential operation between received preamble samples at adjacent selected frequency subcarriers to obtain a binary differential sequence, generating binary reference sequences for the selected frequency subcarriers, performing differential despreading based on the binary differential sequence and the binary reference sequences to obtain despread sequences, and performing a search on despread sequences to determine a cell-segment, reference sequence, and carrier frequency offset.

Certain embodiments provide an apparatus for detecting a cell identification (ID-cell) index and a coarse carrier frequency offset (CFO) estimation. The apparatus generally includes logic for performing a hard differential operation between received preamble samples at adjacent selected frequency subcarriers to obtain a binary differential sequence, logic for generating binary reference sequences for the selected frequency subcarriers, logic for performing differential despreading based on the binary differential sequence and the binary reference sequences to obtain despread sequences, and logic for performing a search on despread sequences to determine a cell-segment, reference sequence, and carrier frequency offset.

Certain embodiments provide an apparatus for detecting a cell identification (ID-cell) index and a coarse carrier frequency offset (CFO) estimation. The apparatus generally includes means for performing a hard differential operation between received preamble samples at adjacent selected frequency subcarriers to obtain a binary differential sequence, means for generating binary reference sequences for the selected frequency subcarriers, means for performing differential despreading based on the binary differential sequence and the binary reference sequences to obtain despread sequences, and means for performing a search on despread sequences to determine a cell-segment, reference sequence, and carrier frequency offset.

Certain embodiments provide a computer-program product for detecting a cell identification (ID-cell) index and a coarse carrier frequency offset (CFO) estimation, comprising a computer readable medium having instructions stored thereon, the instructions being executable by one or more processors. The instructions generally include instructions for performing a hard differential operation between received preamble samples at adjacent selected frequency subcarriers to obtain a binary differential sequence, instructions for generating binary reference sequences for the selected frequency subcarriers, instructions for performing differential despreading based on the binary differential sequence and the binary reference sequences to obtain despread sequences, and instructions for performing a search on despread sequences to determine a cell-segment, reference sequence, and carrier frequency offset.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
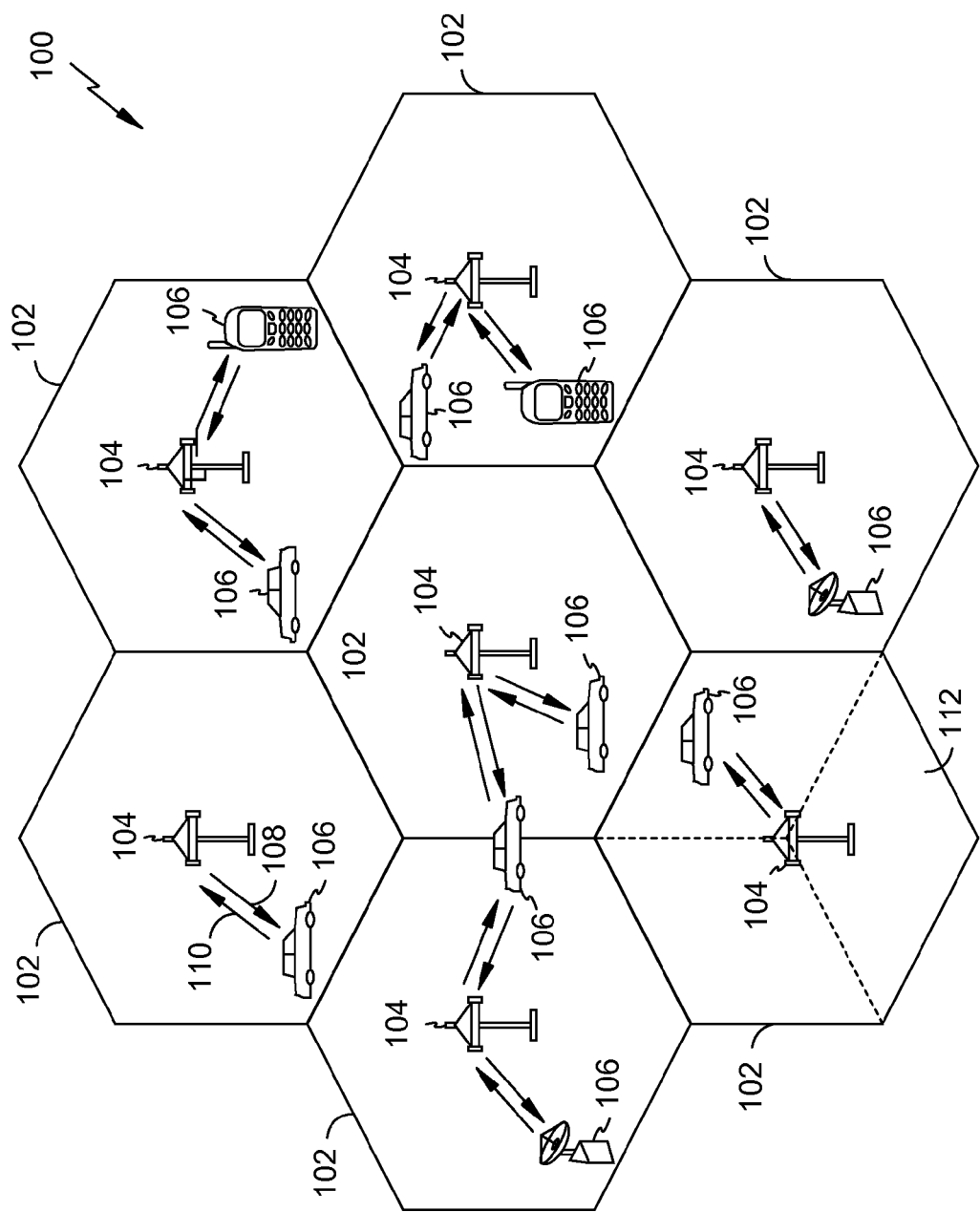
FIG. 1 illustrates an example wireless communication system, in accordance with certain embodiments of the present disclosure.

Orthogonal Frequency Division Multiplexing (OFDM) and Orthogonal Frequency Division Multiple Access (OFDMA) wireless communication systems under Worldwide Interoperability for Microwave Access (WiMAX) standard, use a network of base stations to communicate with wireless devices (i.e., mobile stations) registered for services in systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MSs).

The initial access of a mobile station into a wireless network typically involves a search for identification of the best cell to be associated with (a search for ID-cell index) and a coarse carrier frequency offset (CFO) estimation.

Every base-station in the wireless network may broadcast cell-specific preamble sequences to a mobile station (MS). In order to properly detect the subsequent data signals, during primary synchronization an MS should detect the identifier of the cell which corresponds to the most appropriate serving base station (typically, the nearest base station). Furthermore, the carrier frequency of an MS should exactly match the carrier frequency of a serving BS. However, the carrier frequencies between mobile and base station may be slightly different in some cases, leading to a non-zero frequency offset in the received OFDM(A) signal. OFDM(A) signals are very susceptible to such frequency offset, which causes a loss of orthogonality between OFDM(A) subcarriers and results in inter-carrier interference (ICI) and a severe increase in error rate of the recovered data at the receiver. Accordingly, proper estimation and correction of the carrier frequency offset is important in order to properly receive an OFDM(A) signal that has been transmitted across a wireless channel and demodulate the symbols from the received signal.

The ID-cell index may be detected based on known technique with differential demodulation applied between neighboring subcarriers of a received preamble sequence, typically between subcarriers that are at least three frequency gaps apart. However, this particular approach may involve a substantial number of complex multiplications. Also, the well-known "Schmidl-Cox" algorithm for coarse carrier frequency offset estimation has significant computational complexity because it employs autocorrelation of received preamble sequence involving complex multiplication operations.

Certain embodiments of the present disclosure generally provide a technique for primary synchronization of communication signals that involves a joint search for the ID-cell index and the CFO estimation. The technique may be based on hard differential operations between received preamble samples, as well as on binary differential despreading. This particular approach may substantially simplify computational complexity, and provide s unified algorithm for the ID-cell index search and the CFO estimation. It is assumed in the proposed approach that symbol/frame boundary may be acquired in previous stages of a primary synchronization process.

The word "exemplary" is used herein to mean "serving as an example, instance, or illustration." Any embodiment described herein as "exemplary" is not necessarily to be construed as preferred or advantageous over other embodiments.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
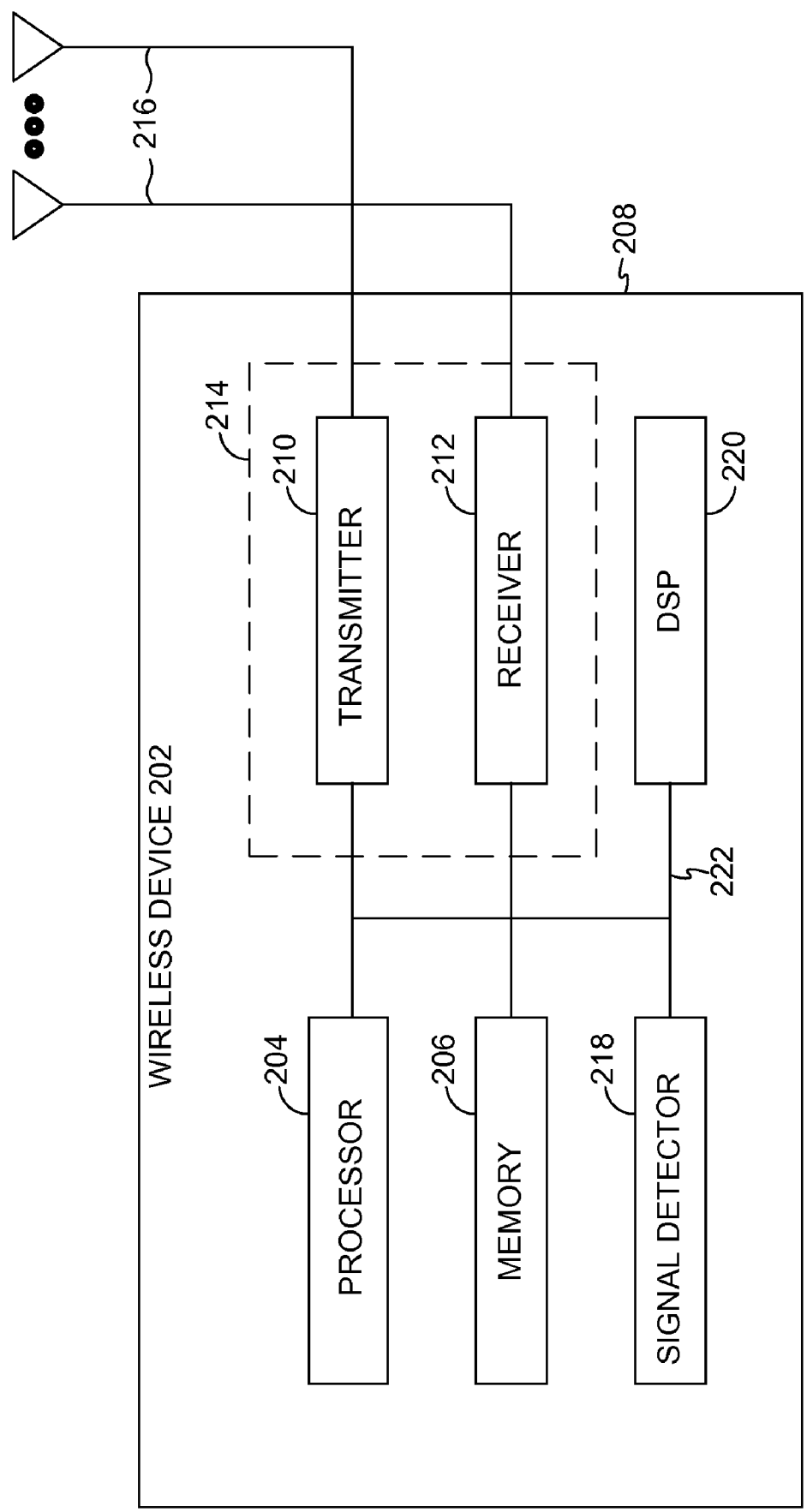
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
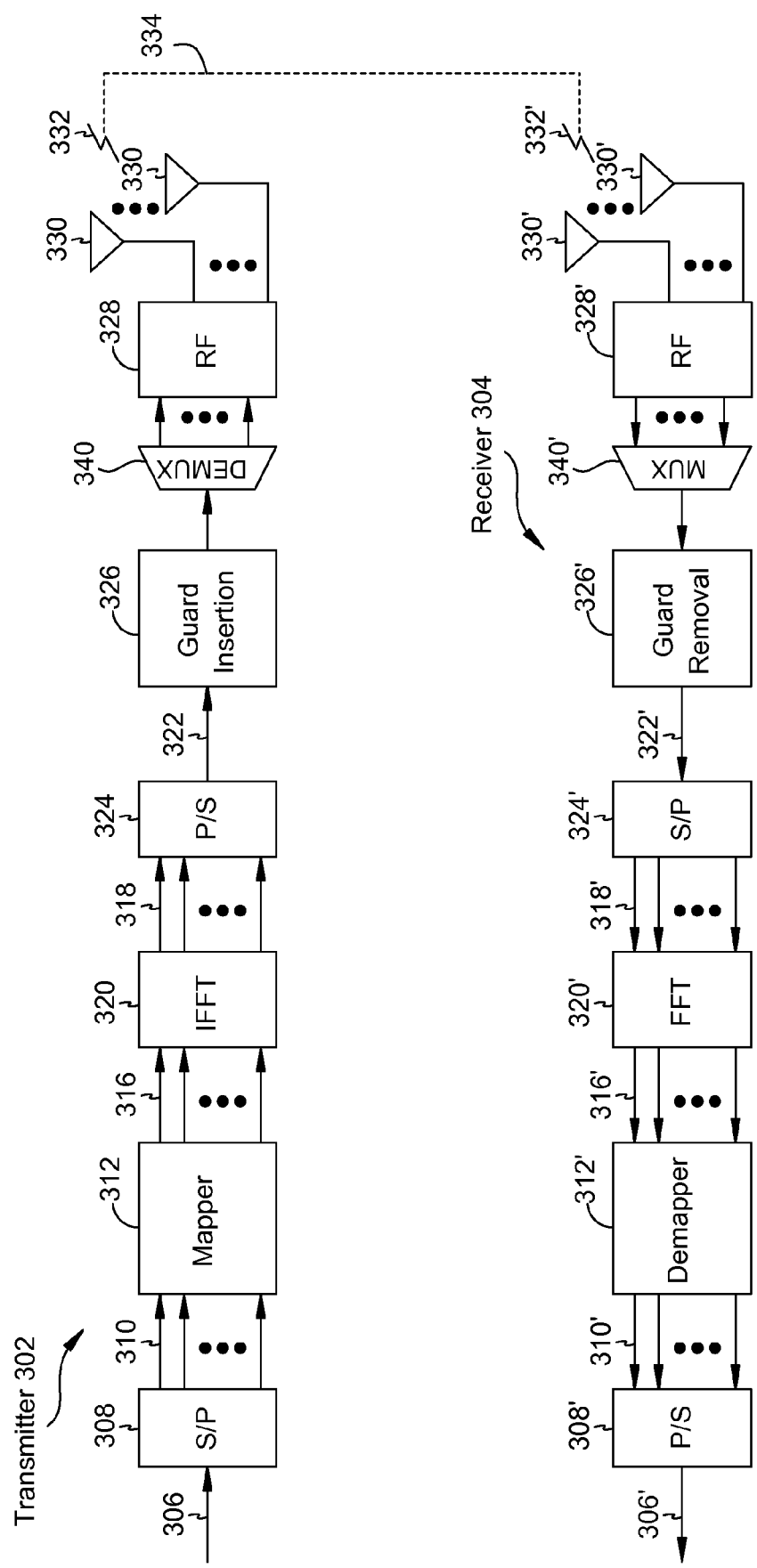
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, Ns, is equal to Ncp (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The signal from the guard insertion component 326 may then be input into demultiplexer 340 to generate different data streams for a plurality of transmit antennas (or equivalently, spatial subchannels). After that, the base-band data stream for each antenna can be upconverted to a desired transmit frequency band by a radio frequency (RF) front end 328, and the antenna array 330 may then transmit the resulting signal 332 across multiple spatial subchannels 334.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a plurality of spatial subchannels 334. When a signal 332' is received by the antenna array 330', the received signal 332' may be downconverted to a baseband signal by an RF front end 328' and converted into a single stream by multiplexer 340'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 350'.

Exemplary MIMO-OFDM System Model

Figure 4:
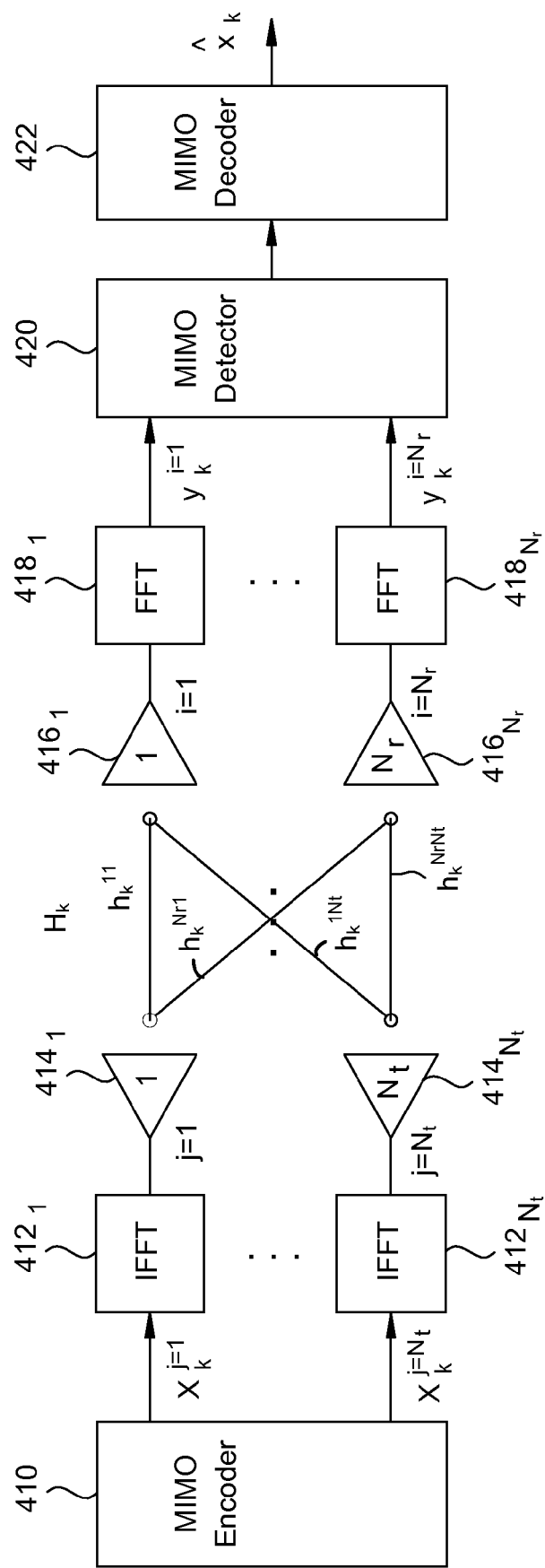
FIG. 4 illustrates a block diagram of a generic multiple-input multiple-output (MIMO) OFDM wireless system in accordance with certain embodiments of the present disclosure.

FIG. 4 shows a block diagram of a generic multiple-input multiple-output (MIMO) OFDM(A) wireless communication system with NT transmit and NR receive antennas. The system model for the kth subcarrier (frequency bins or subchannels) may be represented with linear system equation:

$$y_k = H_k x_k + n_k, \quad k=1, 2, \ldots, N_{FFT} \tag{1}$$

where $N_{FFT}$ is the total number of orthogonal subcarriers. Variables from the system equation may be defined as:

$$y_k = [y_k^1 \ y_k^2 \ \ldots \ldots \ldots \ y_k^{N_R}]^T, \tag{2}$$

$$H_k = [h_k^1 \ h_k^2 \ \ldots \ldots \ldots \ h_k^{N_T}] \tag{3}$$

$$= \begin{bmatrix} h_k^{11} & h_k^{12} & \ldots \ldots \ldots & h_k^{1N_T} \\ & \ldots \ldots \ldots & \\ h_k^{N_R 1} & h_k^{N_R 2} & \ldots \ldots \ldots & h_k^{N_R N_T} \end{bmatrix},$$

$$x_k = [x_k^1 \ x_k^2 \ \ldots \ldots \ldots \ y_k^{N_T}]^T, \tag{4}$$

$$n_k = [n_k^1 \ n_k^2 \ \ldots \ldots \ldots \ n_k^{N_R}]^T, \tag{5}$$

where $y_k$ is $[N_R \times 1]$ received symbol vector, $H_k$ is $[N_R \times N_T]$ channel matrix and $h_k^j$ is its jth column vector that contains channel gains between the transmit antenna j and all NR receive antennas, $x_k$ is $[N_T \times 1]$ transmitted symbol vector, $n_k$ is $[N_R \times 1]$ complex noise vector with covariance matrix $E(n_k n_k^H)$.

As illustrated in FIG. 4, the transmission signal may be first encoded by MIMO encoder 410. A redundancy may be included to protect the information data during the transmission over noisy wireless channels. An encoded signal may then be split into NT spatial data streams $x_k^1, x_k^2, \ldots, x_k^{N_T}$ as shown in FIG. 4. A plurality of spatial data streams can be converted into time domain by utilizing Inverse Fast Fourier Transform (IFFT) units $412_1, \ldots, 412_{N_T}$. The signal may then be up converted to a desired transmission frequency band and transmitted from NT transmit antennas $414_1, \ldots, 414_{N_T}$ over $N_R \cdot N_T$ single-input single-output (SISO) channels.

NR receive antennas $416_1, \ldots, 416_{N_R}$ may be employed at the receiver. Received streams can be converted back into a frequency domain by using the Fast Fourier Transform (FFT) units $418_1, \ldots, 418_{N_R}$. A frequency domain signal may be input into MIMO detector 420 that generates reliability information about coded bits transmitted over a plurality of spatial sub-channels. A reliability message represents a probability that a particular transmitted coded bit is either bit "0" or bit "1". This information may be passed to the outer MIMO channel decoder 422, and the estimated information $\hat{x}_k$ for a plurality of spatial sub-channels (transmit antennas) may be available after removing the redundancy included at the transmitter.

Exemplary ID-CELL Index Detection and Course Frequency Offset Estimation

The techniques presented herein may provide a simplified method for ID-cell index search and coarse carrier frequency offset (CFO) estimation relative to conventional techniques. The proposed approach may be applied, for example, in WiMAX systems with multiple transmit and multiple receive antennas during a primary synchronization between mobile subscriber and base station.

For certain embodiments, a search algorithm for detection of the ID-cell index and estimation of the CFO may be adopted in the frequency domain based on differential pseudo-random noise (PN) sequence. The differential PN sequence may be generated by utilizing downlink (DL) preamble symbols that are broadcasted from a newly serving BS to an MS during a primary synchronization process.

The channel coherent bandwidth B may be defined in the frequency domain as follows:

$$B = \frac{1}{5\tau_{rms}}, \tag{6}$$

where $$\tau_{rms} = \sqrt{\overline{\tau^2} - \overline{\tau}^2}, \tag{7}$$

$$\overline{\tau^2} = \frac{\sum_{l=1}^{L} h_l^2 \tau_l^2}{\sum_{l=1}^{L} h_l^2}, \tag{8}$$

$$\overline{\tau} = \frac{\sum_{l=1}^{L} h_l^2 \tau_l}{\sum_{l=1}^{L} h_l^2}, \tag{9}$$

subscript "rms" denotes the root mean square, $h_l$ is the complex gain of the lth path of a time-domain channel between any transmit and any receive antenna, and $\tau_l$ represents time delay for particular channel path.

In a relatively extreme case of two identical channel paths with time delay between them of $$\frac{1}{8} \cdot T_u \left( \tau_2 - \tau_1 = \frac{1}{8} \cdot T_u \right),$$

where $T_u$ is the useful OFDM symbol time that is equal to the inverse of the gap between adjacent subcarriers in frequency domain, equation (7) becomes:

$$\tau_{rms} = \frac{1}{2} \cdot \left( \frac{1}{8} \cdot T_u \right) \tag{10}$$

After combining equation (6) and equation (10), the channel coherent bandwidth B in the frequency domain may be given as follows:

$$B = \frac{16}{5T_u} > 3\Delta f, \tag{11}$$

where $\Delta f$ is the frequency gap between adjacent subcarriers. Therefore, according to equation (11), a channel between any transmit and any receive antenna may be considered stationary for three consecutive subcarriers.

Linear phase rotation θ of the received signal due to the FFT window offset t at the kth frequency subcarrier may be represented as:

$$\theta = e^{2\pi k t/N_{FFT}}, \tag{12}$$

where NFFT is the size of FFT. Therefore, a phase difference $\theta_{diff}$ between subcarriers that are three frequency gaps apart due to a linear phase rotation may be calculated as:

$$\theta_{diff} = e^{2\pi 3 t/N_{FFT}} \tag{13}$$

In an exemplary case of the wireless system defined by the WiMAX standard with 1024 frequency subcarriers (size of FFT is equal to 1024), the phase difference between subcarriers that are separated by three frequency gaps is close to zero and may be ignored in further analysis. Moreover, the FFT window offset t may be relatively small after initial time acquisition further reducing the value of phase difference $\theta_{diff}$ given by equation (13).

According to equations (11) and (13), it can be assumed that subcarriers that are separated by at least three frequency gaps may have almost identical frequency-domain channel responses. The FFT output at the subcarrier n+3k and the subcarrier n+3(k+1) may be represented as follows:

$$y_{n+3k} = H_{n+3k} \cdot pn_k, \tag{14}$$

$$y_{n+3(k-1)} = H_{n+3(k+1)} \cdot pn_{k+1}, \tag{15}$$

where pnk is the pseudo-random noise (PN) preamble sequence transmitted from a base station to a mobile station at the kth frequency subcarrier during primary synchronization between these two sides of a communication link.

Figure 5:
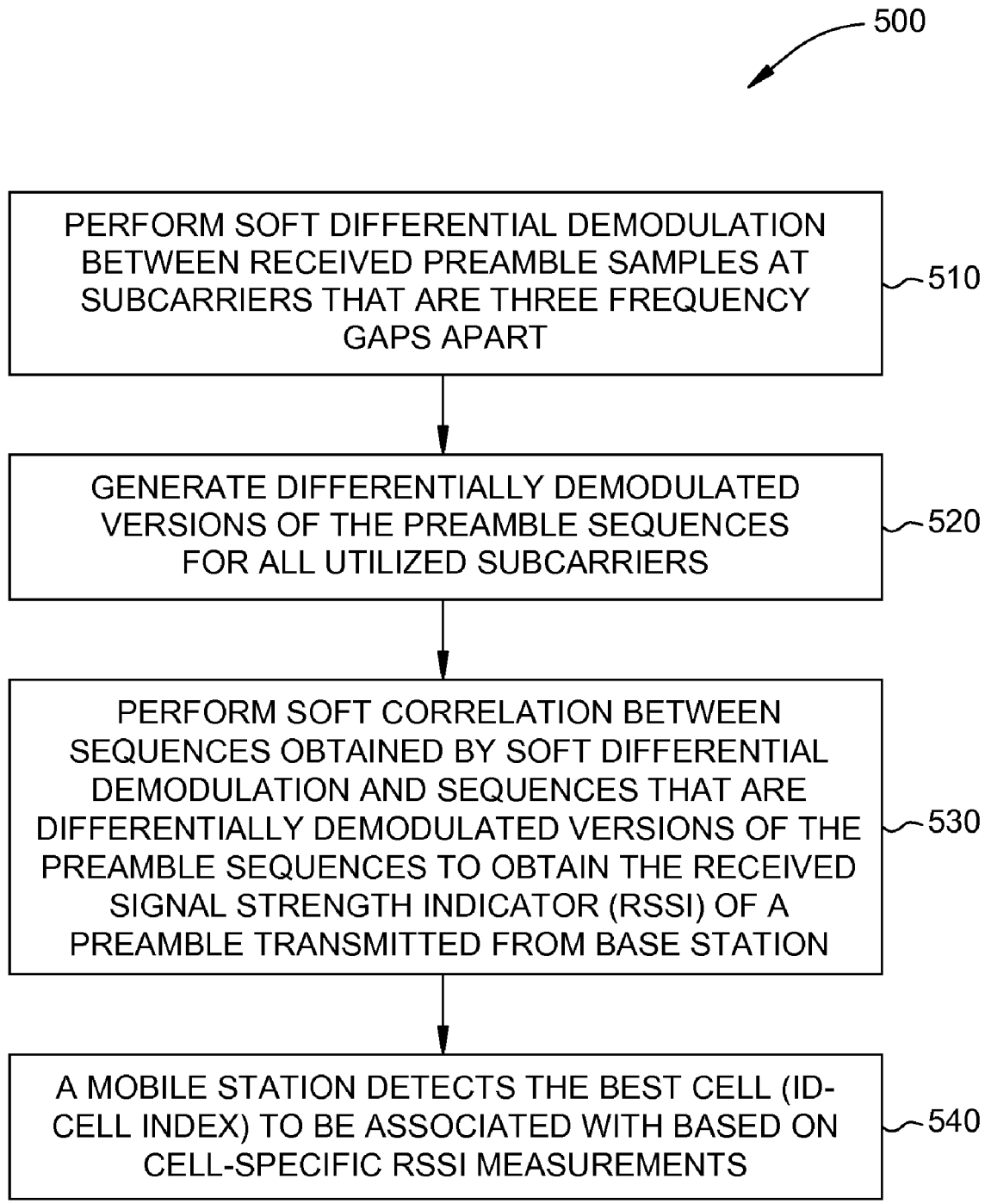
FIG. 5 shows a process of detecting ID-cell index based on soft differential demodulation between neighboring subcarriers of received preamble sequences in accordance with certain embodiments of the present disclosure.
Figure 5A:
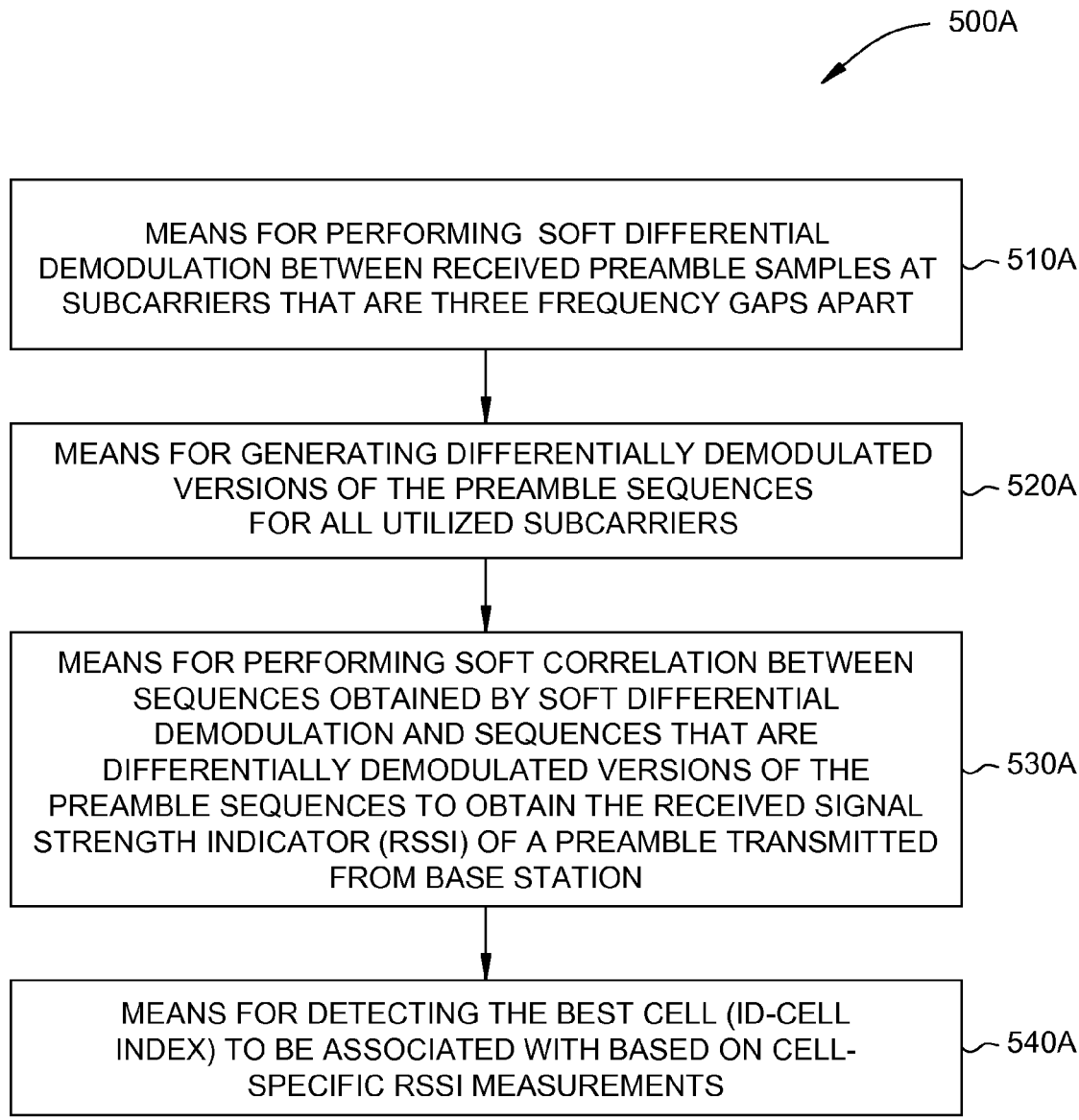

FIG. 5 shows example operations of detecting the ID-cell index based on soft correlation proposed in "Hyoungsoo Lim and Dong Seung Kwon, Initial Synchronization for WiBro, Asia-Pacific Conference on Communications, October 2005". At 510, the soft differential demodulation may be performed between received preamble samples at subcarriers that are separated by three frequency gaps. At 520, differentially demodulated versions of the preamble sequence may be generated for utilized subcarriers. At 530, the soft correlation between sequences obtained from operation 510 and sequences obtained from operation 520 may be performed in order to obtain the Received Signal Strength Indicator (RSSI) of preamble sequences transmitted from specific BSs. Finally, at 540, an MS may identify the most appropriate cell to be associated with based on cell-specific RSSI measurements.

One method for coarse carrier frequency offset (CFO) estimation that exploits the repetition in an OFDM symbol is generally referred to as the "Schmidl-Cox" CFO estimation algorithm. In the "Schmidl-Cox" scheme, the coherent combining over the two successive OFDM symbol durations may be employed. Although the "Schmidl-Cox" CFO estimation algorithm may provide sufficient accuracy, it has substantial computational complexity because autocorrelation on the received preamble sequence is applied which involves significant number of complex multiplications. Furthermore, the "Schmidl-Cox" CFO estimation is disjoint from a search algorithm for the ID-cell index.

Figure 6:
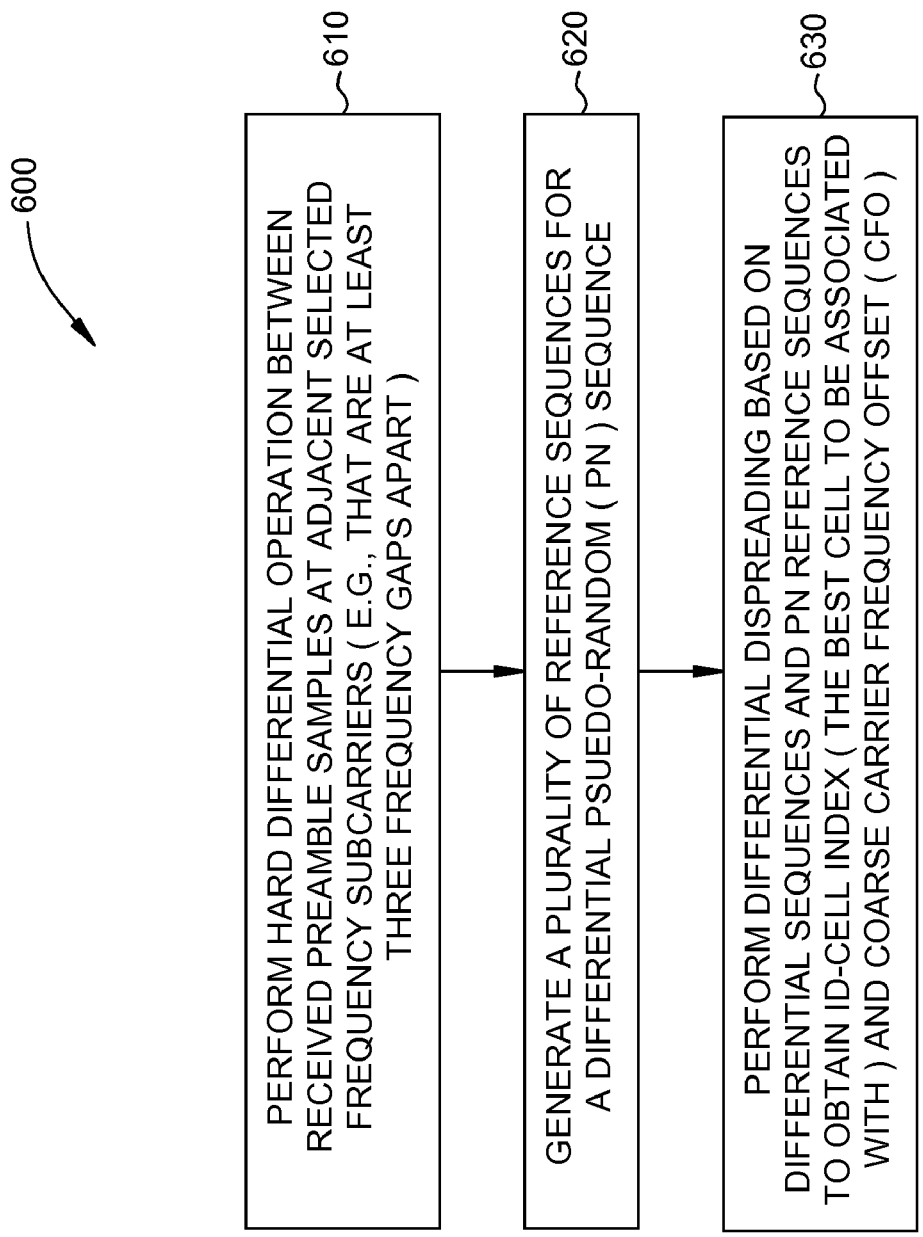
FIG. 6 illustrates a joint process of detecting ID-cell index and CFO estimation based on hard differential operation between neighboring subcarriers of received preamble sequences in accordance with certain embodiments of the present disclosure.
Figure 6A:
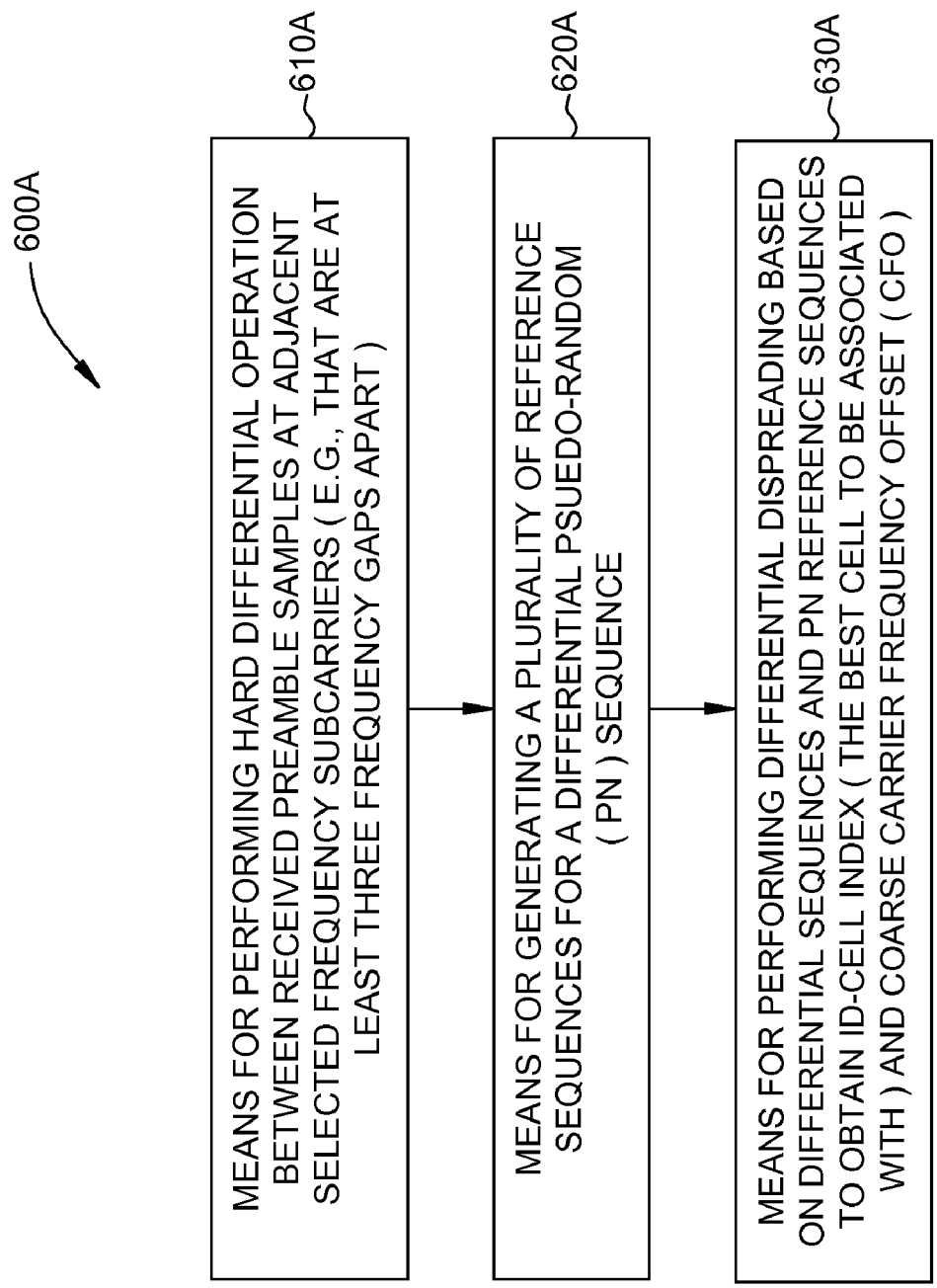

FIG. 6 shows a simplified joint process of detecting the ID-cell index and the CFO estimation based on hard differential operation and binary despreading. At 610, a hard differential operation may be performed between received preamble samples at adjacent selected frequency subcarriers (e.g., that are at least three frequency gaps apart, such as in WiMAX system). The differential pseudo-random noise (PN) sequence may be obtained as follows:

$$PN\_diff_{n,k} = \text{sign}(\text{real}\{y_{n+3k} \cdot y_{n+3(k+1)}^*\}), n=0, 1, \ldots, NS-1, k=0, 1, \ldots, K-1 \qquad (16)$$

where $y_{n+3(k+1)}^*$ represents the conjugate operation on the received preamble sample at the frequency subcarrier n+3(k+1), NS is the number of segments within the cell, and K represents the number of utilized subcarriers per cell-segment.

At 620, a plurality of reference sequences may be generated for the differential pseudo-random noise (PN) sequence obtained by equation (16). The L pseudo-random noise (PN) reference sequence candidates for each utilized subcarrier per cell-segment may be determined as:

$$PN\_ref_{l,k} = pn_{l,k} \cdot pn_{l,k+1}, k=0, 1, \ldots, K-1, l=0, 1, \ldots, L-1, \qquad (17)$$

where pnk is the pseudo-random noise sequence modulated with BPSK modulation, and, therefore, represented with either "+1" or "−1".

At 630, a binary differential despreading may be performed based on binary differential sequences obtained from equation (16), and based on binary reference sequences from equation (17). The ID-cell index and the coarse carrier frequency offset may be jointly determined as a result of the following search algorithm:

$$(ID(n, l), CFO(m)) = \underset{n \in \{0, N_S-1\}, m \in \{-p, p\}, l \in \{0, L-1\}}{\text{argmax}} \left( \sum_{k=0}^{K-1} PN\_diff_{n,k+m} \cdot PN\_ref_{l,k} \right), \qquad (18)$$

where maximum integer frequency offset may be equal to $\pm p \cdot \Delta f$, and $\Delta f$ is the frequency gap between two adjacent subcarriers.

Computational complexity of the search algorithm given by equation (18) may be evaluated as a total number of utilized arithmetic operations. In this disclosure, an exemplary case defined by the WiMAX standard may be considered that assumes NS=3 cell-segments, K=283 used subcarriers per segment, L=114 pseudo-random noise (PN) reference sequence candidates per segment and per subcarrier. Moreover, the maximum integer frequency offset according to the WiMAX standard may be equal to $\pm 7\Delta f$.

In order to calculate binary differential sequence $PN\_diff_{n,k}$ given by equation (16), 3·283=849 complex multiplications may be required. Because of the hard differential operation and the fact that the PN preamble sequences from equations (14)-(15) may be modulated with the BPSK modulation, additional complex multiplication operations may not be required for the binary PN despreading defined by equation (18). Computational complexity of the binary PN despreading from equation (18) may be determined as a number of addition operations: there are total of 283·114·(2·7)·3=1,355,004 real additions required for the search algorithm defined by equation (17). Factor "283" corresponds to a length of differential PN sequence (number of utilized subcarriers per cell-segment), factor "114" corresponds to a number of ID-cell PN sequence candidates per cell-segment and per subcarrier, factor "(2*7)" corresponds to an absolute maximum integer frequency offset that may be equal to $\pm 7\Delta f$, and factor "3" corresponds to a number of segments within the cell.

For the same exemplary case defined by the WiMAX standard, computational complexity of the cell identification search algorithm (e.g., as proposed in "Hyoungsoo Lim and Dong Seung Kwon, Initial Synchronization for WiBro, Asia-Pacific Conference on Communications, October 2005") may be measured as:

$$\left(\frac{N_S \cdot K}{2} - 1\right) \cdot [1 + L \cdot (2 \cdot p)] = 676{,}330 \text{ complex multiplications} \qquad (19)$$

and $$\left(\frac{N_S \cdot K}{2} - 2\right) \cdot [1 + 2 \cdot L \cdot (2 \cdot p)] = 1{,}349{,}043 \text{ real additions.} \qquad (20)$$

Computational complexity of the CFO estimation algorithm (as proposed by "T. M. Schmidl and D. C. Cox, Robust frequency and timing synchronization for OFDM, vol. 45, no. 12, pp. 1613-1621, December 1997") may be approximately equal to:

$$L_{CP} + \frac{N_{FFT}}{2} = 640 \text{ complex multiplications} \qquad (21)$$

and $$2 \cdot \left(L_{CP} + \frac{N_{FFT}}{2} - 1\right) = 1278 \text{ real additions,} \qquad (22)$$

where $L_{CP}$ is the length of cyclic prefix equal to 128 samples for this particular exemplary case.

It can be observed from equations (19)-(22) that the proposed binary search algorithm given by equations (16)-(18) may significantly reduce computational complexity of alternative techniques from the literature since the number of complex multiplications may be decreased from 676,970 to only 849.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for detecting a cell identification (ID-cell) index and a coarse carrier frequency offset (CFO) estimation, comprising:
   performing a hard differential operation between received preamble samples at adjacent selected frequency subcarriers to obtain a binary differential sequence;
   generating binary reference sequences for the selected frequency subcarriers;
   performing differential despreading based on the binary differential sequence and the binary reference sequences to obtain despread sequences; and
   performing a search on despread sequences to determine a cell-segment, reference sequence, and carrier frequency offset.

2. The method of claim 1, further comprising determining an ID-cell index based, at least on the detected cell-segment.

3. The method of claim 1, further comprising determining an ID-cell index based, at least on the detected cell-segment and a reference sequence transmitted from the base station.

4. The method of claim 3, wherein the reference sequence is transmitted from the base station to the mobile station during primary synchronization.

5. The method of claim 1, wherein generating binary reference sequences for the selected frequency subcarriers comprises utilizing the plurality of preamble sequences.

6. An apparatus for detecting a cell identification (ID-cell) index and a coarse carrier frequency offset (CFO) estimation, comprising:
   logic for performing a hard differential operation between received preamble samples at adjacent selected frequency subcarriers to obtain a binary differential sequence;
   logic for generating binary reference sequences for the selected frequency subcarriers;
   logic for performing differential despreading based on the binary differential sequence and the binary reference sequences to obtain despread sequences; and
   logic for performing a search on despread sequences to determine a cell-segment, reference sequence, and carrier frequency offset.

7. The apparatus of claim 6, further comprising logic for determining an ID-cell index based, at least on the detected cell-segment.

8. The apparatus of claim 6, further comprising logic for determining an ID-cell index based, at least on the detected cell-segment and a reference sequence transmitted from the base station.

9. The apparatus of claim 8, wherein the reference sequence is transmitted from the base station to the mobile station during primary synchronization.

10. The apparatus of claim 6, wherein the logic for generating binary reference sequences for the selected frequency subcarriers comprises logic for utilizing the plurality of preamble sequences.

11. An apparatus for detecting a cell identification (ID-cell) index and a coarse carrier frequency offset (CFO) estimation, comprising:
  means for performing a hard differential operation between received preamble samples at adjacent selected frequency subcarriers to obtain a binary differential sequence;
  means for generating binary reference sequences for the selected frequency subcarriers;
  means for performing differential despreading based on the binary differential sequence and the binary reference sequences to obtain despread sequences; and
  means for performing a search on despread sequences to determine a cell-segment, reference sequence, and carrier frequency offset.

12. The apparatus of claim 11, further comprising means for determining an ID-cell index based, at least on the detected cell-segment.

13. The apparatus of claim 11, further comprising means for determining an ID-cell index based, at least on the detected cell-segment and a reference sequence transmitted from the base station.

14. The apparatus of claim 13, wherein the reference sequence is transmitted from the base station to the mobile station during primary synchronization.

15. The apparatus of claim 11, wherein the means for generating binary reference sequences for the selected frequency subcarriers comprises means for utilizing the plurality of preamble sequences.

16. A computer-program product for detecting a cell identification (ID-cell) index and a coarse carrier frequency offset (CFO) estimation, comprising a computer readable medium having instructions stored thereon, the instructions being executable by one or more processors and the instructions comprising:
  instructions for performing a hard differential operation between received preamble samples at adjacent selected frequency subcarriers to obtain a binary differential sequence;
  instructions for generating binary reference sequences for the selected frequency subcarriers;
  instructions for performing differential despreading based on the binary differential sequence and the binary reference sequences to obtain despread sequences; and
  instructions for performing a search on despread sequences to determine a cell-segment, reference sequence, and carrier frequency offset.

17. The computer-program product of claim 16, wherein the instructions further comprise instructions for determining an ID-cell index based, at least on the detected cell-segment.

18. The computer-program product of claim 16, wherein the instructions further comprise instructions for determining an ID-cell index based, at least on the detected cell-segment and a reference sequence transmitted from the base station.

19. The computer-program product of claim 18, wherein the reference sequence is transmitted from the base station to the mobile station during primary synchronization.

20. The computer-program product of claim 16, wherein the instructions for generating binary reference sequences for the selected frequency subcarriers further comprise instructions for utilizing the plurality of preamble sequences.

* * * * *